United States Patent [19]

Giebel et al.

[11] Patent Number: 4,734,048
[45] Date of Patent: Mar. 29, 1988

[54] DISTRIBUTOR HOUSING FOR COMMUNICATION CABLES

[75] Inventors: Wolfgang Giebel, Planegg; Hans Laar; Josef Schramm, both of Munich, all of Fed. Rep. of Germany

[73] Assignee: Siemens Aktiengesellschaft, Berlin and Munich, Fed. Rep. of Germany

[21] Appl. No.: 883,376

[22] Filed: Jul. 8, 1986

[30] Foreign Application Priority Data

Jul. 10, 1985 [DE] Fed. Rep. of Germany ....... 3524637

[51] Int. Cl.[4] ............................................. H01R 4/24
[52] U.S. Cl. .................................... 439/201; 439/409; 439/521
[58] Field of Search ............. 339/96, 97 R, 97 P, 339/98, 99 R; 439/199, 201, 203, 204, 521, 519, 389, 391, 395, 409, 417

[56] References Cited

U.S. PATENT DOCUMENTS

| | | | |
|---|---|---|---|
| 3,573,710 | 4/1971 | Wofford | 339/96 X |
| 4,318,580 | 3/1982 | Fleisher et al. | 339/98 |
| 4,423,918 | 1/1984 | Filreis et al. | 439/521 |
| 4,441,778 | 4/1984 | Sampson | 339/99 R |
| 4,536,050 | 8/1985 | Hung | 339/99 R |
| 4,537,456 | 8/1985 | Brown et al. | 339/99 R |
| 4,610,738 | 9/1986 | Jervis | 439/204 |
| 4,634,207 | 1/1987 | Debbaut | 439/521 |

FOREIGN PATENT DOCUMENTS 2520270 9/1984 Fed. Rep. of Germany .

Primary Examiner—John McQuade
Attorney, Agent, or Firm—Hill, Van Santen, Steadman & Simpson

[57] ABSTRACT

A distributor housing for communication cables in which the connecting unit for the individual wires is permanently integrated into a base component of the housing and the individual wires are first introduced into a positioning means in the contacting process. To form the connection, the pivotable top component of the housing, which has projection aligned with the various contact elements, is pivoted to a closed position to press the individual wires into their contact element.

20 Claims, 3 Drawing Figures

DISTRIBUTOR HOUSING FOR COMMUNICATION CABLES

BACKGROUND OF THE INVENTION

The invention is directed to a distributor housing for communication cables with contact elements for incoming and outgoing cables and conductors. In the area in which the connections are established, the housing is divided in a longitudinal direction to be accessible when required and the housing has fixing or mounting devices for the cables and conductors, which devices coact with the contact elements which are integrated into the base component of the housing.

German OS No. 25 20 270 discloses a distributor housing of a type in which individual contact elements are mounted in the base of the housing and are initially separate, insertable connection terminals. This means that the connection terminals are screwed in or assembled in the form of terminal strips to which the wires are then connected. However, this is complicated in many respects. Appropriate injection molding tools are required, so that the connecting units are mounted in the component produced therefrom. This preassembled component is now secured in the final distributor housing, and the individual wires are connected with tools provided for this purpose. Thus, appropriate tools are required to carry out the assembly operation.

SUMMARY OF THE INVENTION

The present invention is to provide a distributor housing in which the connections between the individual wires can be established in the simplest possible manner without the assistance of special tools and this is accomplished both in respect to the assembly of the distributor housing itself and also in respect to forming the contact with the individual wires. This aim is fulfilled by a distributor housing for communication cables with contact elements for incoming and outgoing conductors, wherein the area at which the connections are obtained is divided in a longitudinal direction and is accessible when required and contact elements are integrated in the base component. The improvements are contacting elements which are arranged in a top component of the distributor housing in accordance with the position of the contact elements of the connecting units arranged in the base component so that on movement of the components into a closed position, the contacting elements coact with the contact elements to make a connection between the contact element and the conductor.

The advantages of the invention may be considered to consist in the fact that, on the one hand, no assembly of connecting units and the like need be carried out and, on the other hand, the existing design of the distributor housing is such that the connection of the individual wires to the contact elements after placing the wires in the elements is carried out simply by closing the housing. The connecting unit, which is used, can consist, for example, of individual contact elements. However, it is equally possible to use a connecting unit which consists of a complete module and also to combine a plurality of smaller units. The simple method of fixing the individual wires permits the allocation to be established in a clearly laid out manner without carrying out individual connections. The connections are formed after the conclusion of the preparatory stage of the actual manual assembly of the wires or conductors in this final position by pressing the top component of the distributor housing onto the base component. By virtue of using known blade contacts as the contact element, the connection to the wires is formed without requiring any stripping. These contacts can be constructed so that the measuring adaptor can also be connected. This obviates the need for the normally required assembly tools which can only actuate individual contacts.

The great advantage of the exemplary embodiment in accordance with the present invention is that all contact elements equipped with wires are connected simultaneously, whereas those contact elements which are not equipped with wires undergo no change. The non-actuated contact elements can readily be connected to wires in the same way at any later point of time in which case the already formed connections remain unaffected.

It is also advantageous that protective caps can be simultaneously arranged in the hinged top component of the distributor housing in accordance with the invention at the locations corresponding to the connection being formed at the contact elements and remain as a protection over the corresponding connection during the contacting process. These protective caps also remain undisturbed over the connection during later reopening process so that the protection is subsequently maintained. The protective caps can represent individual elements or can be combined in groups so that the entire function group is covered simultaneously.

In addition to exerting a protective function for the overall arrangement, the top component of the distributor housing additionally fulfills the function of a contacting tools so that it acts simultaneously on all the contacts or connections to be formed. The closing forces are kept low both as a result of the optimum closing geometry, which is due to the hinged structure, which causes contacts close to the hinges to be made first so that all contacts are not necessarily simultaneously made and also be a suitable closing sequence. The latter is carried out, for example, in that all the incoming wires of the cable are connected in the one operating step, whereas perhaps only part of the outgoing conductors are connected in the next operating step. The protective function can be expanded by the use of the above described protective caps.

DESCRIPTION OF THE PREFERRED EMBODIMENTS

Figure 1:
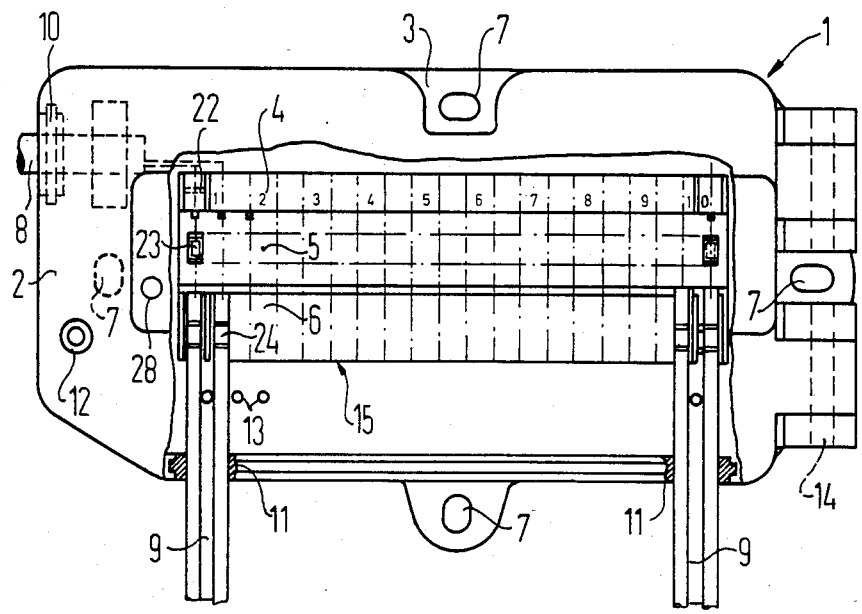
FIG. 1 is a plan view with portion broken away for purpose of illustration of a distributor housing in accordance with the present invention.
Figure 2:
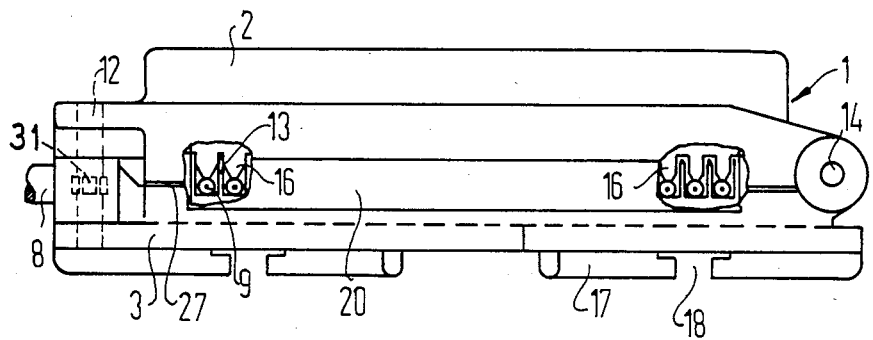
FIG. 2 is a side view with portions broken away of the distributor housing of FIG. 1.

The principles of the present invention are particularly useful when incorporated in a distributor housing generally indicated at 1 in FIGS. 1 and 2. The housing 1 is composed of a top component 2 and a base component 3 (FIG. 2) which are hinged along one side by a hinge 14.

As illustrated in FIG. 1, portions are broken away to illustrate an inner arrangement of an integrated, permanently mounted connecting unit 15. Here it can be seen that wires of an incoming cable 8 extend laterally into the distributor housing 1 via a cable support and an inlet seal 10. The individual wires are first fixed in the position of contact elements 22 of the connecting unit 15 by fixing or mounting means 4 without forming any connections. With the connecting unit 15, the individual contact elements 22 are conducted to the outgoing contact elements 24 at which the outgoing conductors 9 are connected. Between the contacts 22 and 24, a bridging arrangement 23 is provided and has other terminals, in particular for fuse elements, such as current fuses or surge arresters. These contact facilities or arrangement 23 either represent spring elements, openings or the like.

The distributor housing 1 has the connecting unit 15 integrated into the base component 3. The connecting unit 15 consists of recesses in the base component 3 into which the contacts are introduced. An injection molding component, which is placed on the contacts in the recesses, safeguards the contacts from unintentional contact or falling out. In this exemplary embodiment, the base component 3 and the top component 2 as mentioned hereinabove, are hinged to one another via an articulation or hinge 14. The top component 2 also contains additional features in accordance with the present invention which will be explained in detail later in the description. However, it can also be seen from FIG. 1 that the connection for the so-called drop wires are provided at the output of the distributor housing 1. Drop wires either represent individual wires or represent two conductors which are connected to one another via a common bridge so that they can be considered as a double connector. Both the drop wire variants can lead out of the distributor housing. The double conductors are secured by fixing devices or means, which are in the form of pins 13, which are pressed into the bridge of the drop-wire and in this way serve as a support. Sealing in the output direction is effected via appropriate, adaptable seals 11, which can either consist of plastically deformable filler components or a clamping apertures in the top component. A closing pressure means 12 is also shown, which fundamentally consists of a screw arrangement which can be simply turned following the closure of the top component 2 in order to magnify the necessary closing pressure which is increased by this arrangement. To safeguard against unintentional closure, a lock 31 (FIG. 2) is provided. As already mentioned, the top component 2 is designed so that during the closing process as it moves onto the base component 3, it establishes the connections between the already positioned wires and the integrated contacts. Finally, it can be seen from FIG. 1 that the mounting of the distributor housing can be obtained by the aid of fixing or mounting means 7, which fundamentally consist of longitudinal and transverse openings on the two main axes of the housing. In this way, it is possible to compensate discrepencies which occur during the positioning of the dowels required for the mounting.

As best illustrated in FIG. 2, the distributor housing is longitudinally divided in a dividing plane 27 and when closed is sealed so as to be water tight by means of an insertable elastomer seal. The two housing components 2 and 3 are connected to one another by the hinge 14. The interior of the top component 2 is equipped with contacting elements or units 16 which face downward towards the connection unit 15 and consist of ribs which will engage the wires such as 9 and press them into the contact elements when the top component is depressed and thus, form the connections. Thus, as already described, the tools required for forming the connection are integrated into the housing itself. Also visible in FIG. 2 are the fixing means or pins 13 with which the double conductors 9 can be secured into the housing.

A further advantage of this construction consists in that when this closing pressure means 12 is used and the normally required pressure force for the formation of the connection do not act upon the housing mountings and thus, cannot negatively affect the mounting to a base, for example, a plaster wall. In the illustrated embodiment, the input-output separation facilities are also easily possible, for example, for measuring purposes. Also arranged on the base component 3 of the distributor housing 1 are mounting means 17 and 18, which can be optionally used in place of the described mounting means 7. The grooves 18 are additionally provided into which, for example, tension bands can be introduced so that the mounting can also be effected by a clamping onto a pole or mast.

Figure 3:
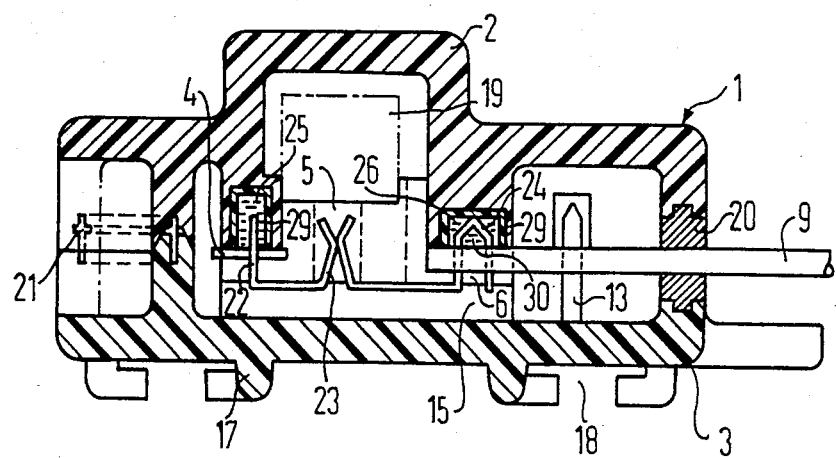
FIG. 3 is cross sectional view with portions in elevation for purposes of illustration taken on a plane of a connection through the distributor housing.

As best illustrated in FIG. 3, the distributor housing 1 has the connecting unit 15 integrated in the base component 3. The connecting unit 15 consists of a row of contact combinations arranged in series which include contact elements 22, 23 and 24. The contact elements 22 serve to accommodate and form a connection with a wire of the input cable, which is supported in the supporting device 21, and the incoming wire are first laid only in the fixing or holding means 4. In contrast, the illustrated state represents the arrangement in which the connections have already been formed had already been achieved by closing the distributor housing 1. The contact elements 22 now continues in the form of double spring contact element 23 through which, on the one hand, the connection with the output contact element 24 can be achieved and, on the other hand, for example, a fuse element or a surge arrester 19 can be connected as required. It is advisable to use cassettes containing, for example, 2×10 fuse elements. The top component 2 is shaped so as to accommodate such a cassette.

A "good earth" or grounding is required for surge arresters. This can be obtained via the inlet cable. FIG. 1 also shows a grounding pin 28, which extends from the exterior into the interior and provides for external and internal grounding.

FIG. 3 also shows recesses 25 and 26, which are provided in the top component 2 and into which corresponding protective caps 29 for the contact elements can be inserted. During the closing process and thus, the connecting process, these protective caps 29 are placed over the contact elements 22 and 24 in a clamping fashion. If necessary, the protective caps can contain a corrosion protective agent or compound 30. However, when the top component 2 is reopened, the protective caps remain on the contact elements so that the protection of the connection is maintained. No switchovers are normally carried out for the incoming cable. Here it is advisable to use a continuous "grease-filled" protective cap.

The distributor housing 1 often will remain closed following the introduction of the incoming cable until the subscriber lines or drop-wires are to be connected or mounted. When these are mounted in the distributor housing, depending upon the development stage, one or more than one pair of conductors can be installed and connected. If the divided protective cap is used, new drop-wires can be introduced, connected and protected at any time without effecting the protection of the old drop-wires. Re-allocation, re-wiring or re-jumping can be carried out at any time. In the output zone, a matching mold component is used, for example, as an output seal 20. Finally, one of the pins can also be seen which as a fixing or mounting means 13 fixes an outgoing drop-wire in the output zone.

As illustrated in FIG. 3, the base component 3 has the grooves and ribs which serve as mounting means 17 and 18 into which tension bands or the like can be inserted in order to fix the distributor housing to a mast or the like. The mounting means are combined with those in FIG. 2 in such a manner that they permit the tensioning band fixing to be carried out on either of two axes which extend at right angles to each other. In each instance, two bands can be used. IDC (insulation displacement contact) technology is of particular significance for contact elements of the housing of the present invention. Although in this housing in accordance with the invention, no additional tools are required. The distributor housing itself consists, for example, of glass fiber reinforced polyester in which the contact elements are embedded. If the design is selected to be such that the protective caps are correctly positioned in the factory. Then, as a safeguard against unintentional closure of the housing and thus, covering the contact elements with the corrosion protection, an intermediate component is expediently provided between the top component 2 and the base component 3 which intermediate component is removed during the later assembly.

A further advantage of the distributor housing consists in that the lateral housing bridges can be kept very small and thus, provide extremely good accessibility during assembly. Thus, the distributor housing of with the invention has a particular advantage when the assembly or wiring is carried out in several phases because the already connected wires with their protection remain uninfluenced by the additional connecting or wiring measures.

It is also possible to modify the capacity of the housing by means of an arrangement of the contact element and/or cable inlets and outlets which differ from that represented in the figures.

Although various minor modifications may be suggested by those versed in the art, it should be understood that we wish to embody with the scope of the patent granted hereon, all such modifications as reasonably and properly come within the scope of our contribution to the art.

We claim:

1. In a distributor housing for communication cables with contact elements for incoming and outgoing conductors of the cables, said housing having an area in which the connections are effected being divided in a longitudinal direction into a top and bottom component to allow accessibility when forming contacts between the conductors and the contact elements of a connecting unit which is integrated in a base component of the housing, the improvements comprising contacting elements being arranged in the top component of the distributor housing and being positioned in accordance with the contact elements which are arranged in the base component so that closing the housing causes an automatic forming of a contact between a conductor and its contact element; and the top component having a plurality of recesses aligned with the contact elements, said recesses receiving protective caps so that simultaneously with the forming of the contact between a wire and a contact element, a protective cap encloses the contact with the closing of the top component onto the bottom component.

2. In a distributor housing according to claim 1, wherein the connecting unit is composed of individual contact elements.

3. In a distributor housing according to claim 1, wherein the connecting unit consists of a complete module.

4. In a distributor housing according to claim 1, wherein the connecting unit of the distributor housing is embedded in the base component in a materially locked fashion.

5. In a distributor housing according to claim 1, wherein mounting devices are arranged in the base component of the distributor housing.

6. In a distributor housing according to claim 1, wherein the top component of the distributor housing is hinged to the base component.

7. In a distributor housing according to claim 1, wherein each of the protective caps is an individual cap.

8. In a distributor housing according to claim 1, wherein the protective caps are provided in a combined group.

9. In a distributor housing according to claim 1, wherein the protective caps contain a protective compound, preferably a corrosion preventive grease.

10. In a distributor housing according to claim 1, wherein the contacting elements take the form of ribs provided in the top component of the housing, said ribs being positioned to be aligned to a particular contact element of the connecting unit in the base component.

11. In a distributor housing according to claim 1, wherein the contact elements comprise groove-like terminals in the distributor housing.

12. In a distributor housing according to claim 1, which includes fixing devices for mounting double cables comprise pins provided in one of the housing components.

13. In a distributor housing according to claim 1, wherein each of the contact elements of the connecting unit is provided with a pair spring contacts for additional units.

14. In a distributor housing according to claim 1, wherein the cable inlets and cable outlets are provided with adaptable sealing elements.

15. In a distributor housing according to claim 1, wherein the plane of the division of the distributor housing between the base component and the top component is provided with an elastomer seal.

16. In a distributor housing according to claim 1, which includes means for applying a closing pressure between the base and top component.

17. In a distributor housing according to claim 16, wherein the means for applying a closing pressure is provided with a lock to safeguard against unintentional closure.

18. In a distributor housing according to claim 1, wherein a component of the housing is provided with mounting means for two main axes of the housing.

19. In a distributor housing according to claim 1, wherein the distributor housing can be assembled in the two main axes.

20. In a distributor housing according to claim 1, wherein the top and base components are hinged together along one side and the housing includes means adjacent the opposite side from the hinge for providing a closure pressure between the top and base components.

* * * * *